United States Patent

Yoshida et al.

Patent Number: 4,522,419
Date of Patent: Jun. 11, 1985

[54] RACK AND PINION TYPE STEERING DEVICE

[75] Inventors: Kenji Yoshida, Zama; Yuichi Sanada, Tokyo, both of Japan

[73] Assignee: Nissan Motor Company, Limited, Japan

[21] Appl. No.: 465,993

[22] Filed: Feb. 11, 1983

[30] Foreign Application Priority Data

Mar. 31, 1982 [JP] Japan .................................. 57-52722

[51] Int. Cl.$^3$ ............................................. B62D 3/12
[52] U.S. Cl. ........................................ 280/96; 74/422; 74/498; 180/148
[58] Field of Search .................... 180/148; 280/96; 74/422, 498

[56] References Cited

U.S. PATENT DOCUMENTS

| | | | |
|---|---|---|---|
| 2,128,329 | 8/1938 | Schjolin | 280/96 |
| 2,867,284 | 1/1959 | Hruska | 180/79.2 |
| 2,954,089 | 9/1960 | Hill | 180/42 |
| 3,709,099 | 1/1973 | Dumeah | 180/148 |
| 3,950,006 | 4/1976 | Wood, Jr. | 280/96 |
| 4,028,957 | 6/1977 | Wright | 74/422 |

FOREIGN PATENT DOCUMENTS

| | | |
|---|---|---|
| 49-76233 | 7/1974 | Japan . |
| 51-162432 | 6/1975 | Japan . |
| 842551 | 7/1960 | United Kingdom . |
| 1028326 | 4/1966 | United Kingdom . |

*Primary Examiner*—Joseph F. Peters, Jr.
*Assistant Examiner*—Kenneth R. Rice
*Attorney, Agent, or Firm*—Leydig, Voit, Osann, Mayer and Holt, Ltd.

[57] ABSTRACT

A rack and pinion type steering device is arranged so that one of axially opposed ends of the device is located in the vicinity of one of the steered road wheels. A rack cover mounted on the end of the device is a bellows boot and is constructed to axially expand and contract in response to the axial movement of the rack shaft of the device.

6 Claims, 4 Drawing Figures

RACK AND PINION TYPE STEERING DEVICE

BACKGROUND OF THE INVENTION

The present invention relates to a steering device of a motor vehicle, and more particularly to a rack and pinion type steering device which is constructed to provide the steered road wheels with a sufficient maximum steering angle.

SUMMARY OF THE INVENTION

According to the present invention, there is provided a rack and pinion type steering device, which comprises a gear housing having a through bore formed therein, a rack shaft axially movably received in the through bore with its opposed first and second end portions projected from the both open ends of the gear housing, a pinion engaging with the teeth of the rack shaft to move the rack shaft axially in response to turning of the steering wheel, a first cover member disposed about the first end portion of the rack shaft with its inside end sealingly fixed to the gear housing and its outside end sealingly fixed to the leading end of the first end portion, the first cover member being constructed to be axially expandable and contractable in response to application of force thereto, and a second cover member disposed about the second end portion of the rack shaft with its inside end sealingly fixed to the gear housing, the second cover member being so constructed as to sealingly cover the second end portion and be axially expandable and contractable in response to the axial movements of the rack shaft.

BRIEF DESCRIPTION OF THE DRAWINGS

Objects and advantages of the present invention will become clear from the following description when taken in conjunction with the accompanying drawings, in which.

DETAILED DESCRIPTION OF THE INVENTION

Prior to describing the invention, one of the conventional rack and pinion type steering devices will be described with reference to FIG. 1 in order to clarify the hitherto encountered problem which the present invention can solve.

Figure 1:
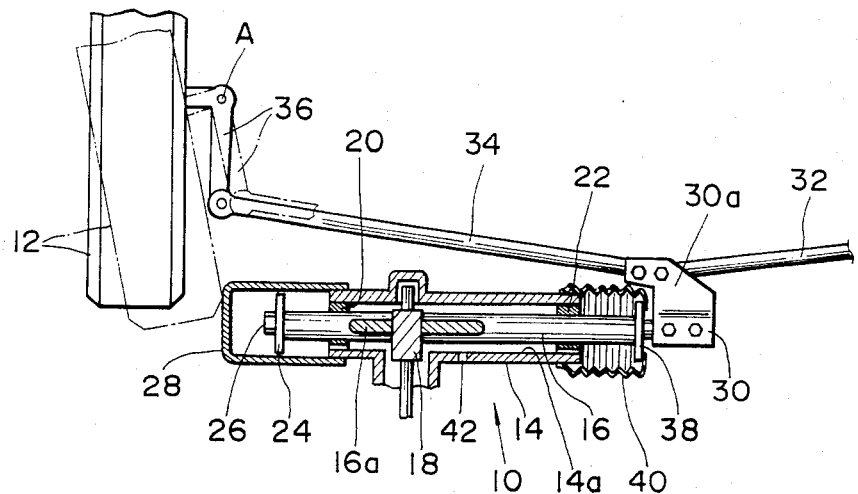
FIG. 1 is a sectional view of a conventional rack and pinion type steering device for pivotally moving vehicle road wheels.

Referring to FIG. 1, there is shown a conventional rack and pinion type steering device 10 for pivotally moving vehicle road wheels 12 (only one wheel is illustrated). The steering device 10 comprises a gear housing 14 having a through bore 14a formed therein. A rack shaft 16 is axially movably disposed in the gear housing 14 with its both ends projected outwardly from the both open ends of the housing 14. A pinion 18, controlled by the steering wheel (not shown), has teeth which engage with the teeth 16a of the rack shaft 16. Bushes 20 and 22 are disposed in the ends of the through bore 14a to slidably support the rack shaft 16. One projected end of the rack shaft 16 has a stopper plate 24 secured thereto by a bolt 26. The stopper plate 24 is engageable with the bush 20, so that the rightward movement (in the drawing) of the rack shaft 16 is limited. A rack cover 28 is fixed at its one open end to the gear housing 14 to cover the leftward projected end of the rack shaft 16. The other projected end (that is, the rightward end) of the rack shaft 16 is provided with a bracket 30 bolted thereto. The bracket 30 has a radially outwardly extending portion 30a to which inboard ends of right and left tie rods 32 and 34 are bolted. The tie rods 32 and 34 are connected through steering arms 36 to the steered right and left road wheels 12, although only the left steering arm and the left road wheel are shown in the drawing. Upon rightward and leftward movement of the tie rods 32 and 34, as shown, the wheel 12 is pivoted about the pivot axis A of the steering arm 36. The rightward projected end of the rack shaft 16 has further a stopper plate 38 secured thereto, which limits the leftward movement of the rack shaft 16. A bellows boot 40 is axially disposed between the gear housing 14 and the stopper plate 38, so that it expands and contracts in response to rightward and leftward movements of the rack shaft 16. The gear housing 14 has an air breather 42 for allowing the smooth expansion and contraction of the bellows boot 40.

When, in operation, the steering wheel (not shown) turns left, the pinion 18 turns left thus moving the rack shaft 16 rightward in the drawing, causing the tie rods 32 and 34 to move rightward. With this, the steered wheels 12 are pivoted counterclockwise (in the drawing) about the axis A thereby steering the vehicle leftward. While, when the steering wheel turns right, reversed movements take place thereby steering the vehicle rightward.

However, the steering device 10 of the type as mentioned hereinabove has suffered from the drawback that as the rack cover 28 is inevitably positioned near one of the steered wheels 12 (that is the left wheel in the illustrated case), the wheels 12 are not given a sufficient maximum steering angle because of avoiding the undesirable contact of the wheel 12 with the rack cover 28. Of course, positioning the steering device 10 away from the wheel 12 may solve such drawback. But, in this case, the steering power produced by the device 10 is not effectively transmitted to the steered wheels, that is, the steering force required to the steering wheel is undesirably increased.

Thus, to solve the above-mentioned drawbacks is an essential object of the present invention.

Figure 2:
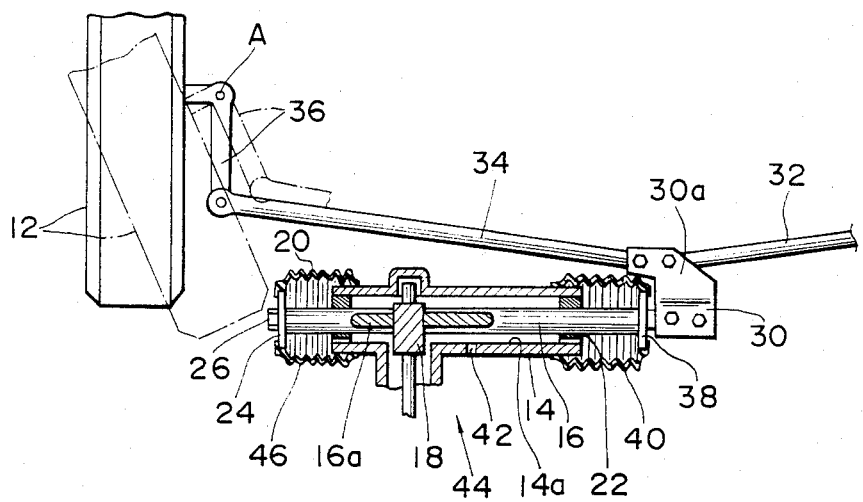
FIG. 2 is a view similar to FIG. 1, but showing a first embodiment of the present invention.

Referring to FIG. 2, there is shown an improved rack and pinion type steering device 44 of a first embodiment of the present invention. The parts and constructions identical to those of FIG. 1 are designated by the same numerals. As is understood when comparing FIG. 2 with the above-stated FIG. 1, the arrangement of the first embodiment is subtantially the same as the above-mentioned conventional steering device 10 except for the rack cover which covers the leftward projected end of the rack shaft 16.

In the first embodiment, an expansible bellows boot 46 is employed in place of the stationary rack cover 28 of the conventional device 10. The boot 46 is constructed of elastic material, such as rubber. As shown, the bellows boot 46 is spacedly disposed about the leftwardly projected end of the rack shaft 16 with its outside end fixed to the stopper plate 24 and its inside end fixed to the gear housing 14.

With the above-stated construction, it is understood that the bellows boot 46 contracts in response to the rightward movement of the rack shaft 16. That is, the leftmost end of the steering device 44 moves in a direction away from the steered left wheel 12 when the steering wheel (not shown) turns left to pivot the wheel 12 counterclockwise about the axis A. This phenomenon induces that the steered wheels 12 are given a sufficient maximum steering angle in leftward turning of the vehicle. In this embodiment, the air breather 42 may be omitted because the expansion of the boot 46 is effected by air contained in the other boot 40 in expanded condition, and vice versa.

Figure 3:
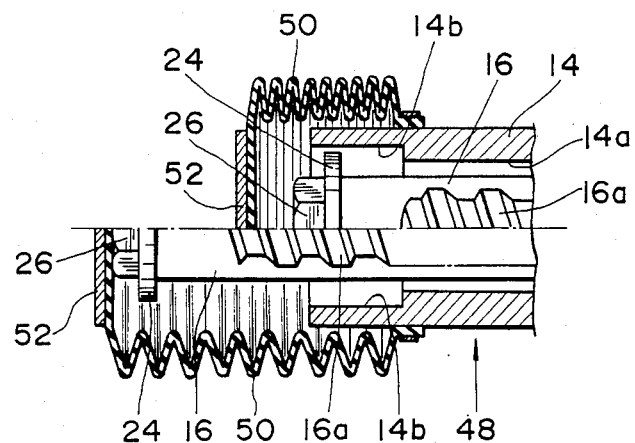
FIG. 3 is an enlarged sectional view of an essential part of a second embodiment of the present invention, showing two different conditions thereof.

Referring to FIG. 3, there is shown, but in part, a second embodiment of the present invention. In the steering device 48 of this second embodiment, a bottomed bellows boot 50 is employed. The boot 50 is of a normally contracted bellows which assumes its contracted condition (shown by the upper part of the drawing) when no external force is applied thereto. As is seen from the drawing, the boot 50 is fixed at its open right end to the left end of the gear housing 14. The closed end of the boot 50 is equipped at its outside surface with a reinforcing plate 52. The left end of the through bore 14a of the gear housing 14 is enlarged to form a stopper plate receiving bore 14b into which the stopper plate 24 is received when the rack shaft 16 assumes its rightmost position.

With the above-stated construction, it is understood that the bellows boot 50 contracts with rightward movement of the rack shaft 16 and expands with leftward movement of the same. During leftward movement of the rack shaft 16, the head of the bolt 26 engages and pushes leftward the closed end of the boot 50 as is seen from the lower half of the drawing. The provision of the stopper plate receiving bore 14b induces increased rightward movement of the rack shaft 16 relative to the gear housing 14, that is, increased maximum steering angle in leftward turning of the vehicle.

Figure 4:
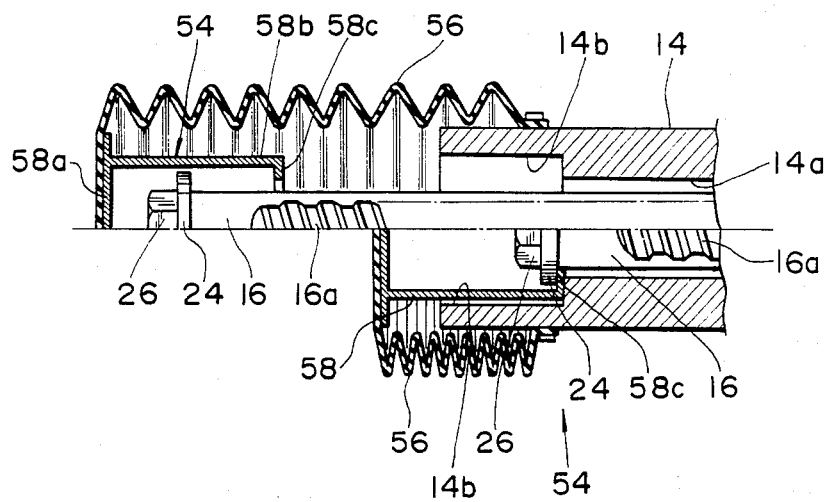
FIG. 4 is a view similar to FIG. 3, but showing a third embodiment of the present invention.

Referring to FIG. 4, there is shown, but in part, a third embodiment of the present invention. In the steering device 54 of the third embodiment, a normally expanded bottomed bellows boot 56 is employed in place of the normally contracted bellows boot 50 of the above-mentioned second embodiment. As is seen from the drawing, the boot 56 is fixed at its open right end to the left end of the gear housing 14. A motion transmitting member 58 is carried by or mounted to the closed end of the boot 56 to move therewith. The member 58 comprises a base portion 58a secured to the closed end of the boot 56, a shank portion 58b extending from the base portion 58a toward the gear housing 14, and an inwardly bent portion 58c formed on the leading end of the shank portion 58b. As is seen from the drawing, the motion transmitting member 58 is so arranged as to put the stopper plate 24 between the base portion 58a and the bent portion 58c. The bent portion 58c is so sized to be engageable with the stopper plate 24, and the shank portion 58b is so sized to provide the stopper plate 24 with a certain free movement relative to the motion transmitting member 58.

With the above-stated construction, it is understood that when, during the rightward movement of the rack shaft 16, the stopper plate 24 comes to engagement with the bent portion 58c, the bellows boot 56 starts to contract and finally assumes its completely contracted condition as is seen from the lower half of the drawing. While, the leftward movement of the rack shaft 16 induces the expanding movement of the bellows boot 16, and when the rack shaft 16 comes to a predetermined position where the boot 16 assumes its full expanded condition, the stopper plate 24 disengages from the bent portion 58c of the motion transmitting member 58 keeping the bellows boot 56 in the full expanded condition. Since the rightward movement of the rack shaft 16 induces the contraction of the bellows boot 16 as is stated hereinabove, the road wheels 12 are given a sufficient maximum steering angle in leftward turning of the vehicle.

Although in the foregoing description, a bellows type boot is used as an essential part of the invention, telescopically engaged tubes may be used in place of the bellows type boot.

What is claimed is:

1. A rack and pinion type steering device comprising:
   a gear housing having a through bore formed therein;
   a rack shaft axially movably received in said through bore with its opposed first and second end portions projected from the both open ends of said gear housing;
   a pinion engaging with the teeth of said rack shaft to move said rack shaft axially in response to turning of the steering wheel;
   a first cover member disposed about said first end portion of the rack shaft with its inside end sealingly fixed to said gear housing and its ouside end sealingly fixed to the leading end of said first end portion, said first cover member being constructed to be axially expansible and contractable in response to movements of said rack shaft; and
   an elastic bellows boot disposed about said second end portion of the rack shaft with its inside end sealingly fixed to said gear housing and an outside closed end portion integral therewith to sealing cover said second end portion, said elastic bellows boot being axially expansible in response to the axial movements of said rack shaft in one direction, and said elastic bellows boot being constructed to assume its contracted position when no external force is applied thereto.

2. A rack and pinion type steering device as claimed in claim 1, further comprising a reinforcing plate which is fixed to said closed portion of the bellows boot.

3. A rack and pinion type steering device as claimed in claim 2, in which said second end portion of said rack shaft is provided with a stopper plate, said stopper plate being brought into contact, with one end of said gear housing when the rack shaft moves in a give direction.

4. A rack and pinion type steering device as claimed in claim 3, in which the end of said gear housing is formed with an enlarged bore which is merged with said through bore, said enlarge bore being sized to receive therein said stopper plate.

5. A rack and pinion type steering device comprising:
   a gear housing having a through bore formed therein;
   a rack shaft axially movably received in said through bore with its opposed first and second end portions projected from the both open ends of said gear housing;
   a pinion engaging with the teeth of said rack shaft to move said rack shaft axially in response to turning of the steering wheel;
   a first cover member disposed about said first end portion of the rack shaft with its inside end sealingly fixed to said gear housing and its ouside end sealingly fixed to the leading end of said first end portion, said first cover member being constructed to be axially expansible and contractable in response to movements of said rack shaft;

an elastic bellows boot disposed about said second end portion of the rack shaft with its inside end sealingly fixed to said gear housing and an outside closed end portion integral therewith to sealing cover said second end portion, said elastic bellows boot being axially expansible in response to the axial movements of said rack shaft in one direction, and said elastic bellows boot being constructed to assume its contracted position when no external force is applied thereto; and a motion transmitting means acting on said elastic bellows boot to contract said boot when the rack shaft moves in a second direction.

6. A rack and pinion type steering device as claimed in claim 5, in which said motion transmitting means is a member which comprises a base portion secured to the closed portion of said bellows boot, a shank portion extending from the base portion toward the gear housing, and an inwardly bent portion formed on the leading end of the shank portion, further in which said second end portion of said rack shaft is provided with a stopper plate, said stopper plate being brought into contact with the inwardly bent portion of the motion transmitting member when the rack shaft moves in a given direction.

* * * * *